S. NORTHCOTT.
AUTOMOBILE HINGE.
APPLICATION FILED JULY 15, 1920.
1,358,099. Patented Nov. 9, 1920.
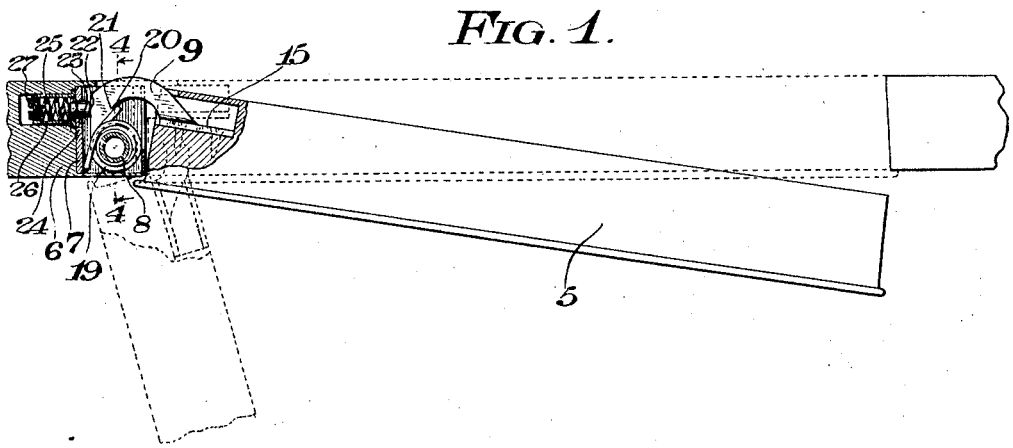
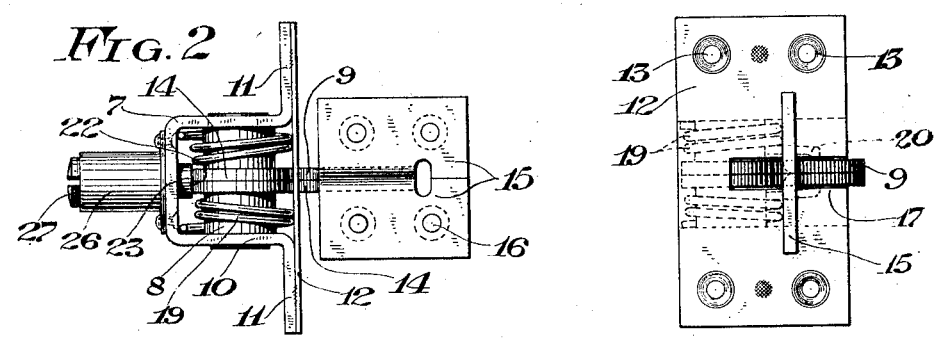
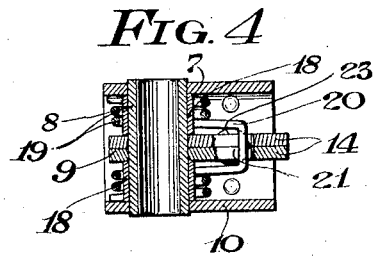
WITNESSES
INVENTOR
Samuel Northcott
ATTORNEY.

UNITED STATES PATENT OFFICE.

SAMUEL NORTHCOTT, OF MADISON, WISCONSIN.

AUTOMOBILE-HINGE.

1,358,099.  Specification of Letters Patent.  Patented Nov. 9, 1920.

Application filed July 15, 1920. Serial No. 396,478.

*To all whom it may concern:*

Be it known that I, SAMUEL NORTHCOTT, a citizen of the United States, and resident of Madison, county of Dane, and State of Wisconsin, have invented new and useful Improvements in Automobile-Hinges, of which the following is a description, reference being had to the accompanying drawings, which are a part of this specification.

The invention relates to hinges for automobile doors.

As usually constructed, when the latch of an automobile door is unlocked the door is free to swing outwardly, and sometimes through carelessness the door is left unlatched so that a slight movement causes it to swing open with the result that it is apt to come in contact with obstructions and be wrenched off. This frequently happens when automobiles are driven into or out of a garage and the door of the automobile is left open. It is also usual to provide a rubber bumper adjacent the door to prevent it from rattling when shut, and these are subject to rapid deterioration. To obviate the above difficulties I have provided a hinge for an automobile in which a spring serves to move the door to closed position and one in which the door is prevented from fully closing until desired by the operator by a stop for the hinge which also serves the purpose of a bumper to prevent rattling.

A further object of the invention is to provide a hinge made from sheet metal stampings.

The invention further consists in the several features hereinafter set forth and more particularly defined by claims at the conclusion hereof.

In the drawings: Figure 1 is a view of an automobile door equipped with a hinge embodying the invention, parts being shown in section; Fig. 2 is a side view of the hinge; Fig. 3 is an end view of the hinge; Fig. 4 is a section taken on the line 4—4 of Fig. 1.

In the drawings, the numeral 5 designates an automobile door hung at the door opening in the side 6 of the automobile upon hinges embodying the invention. Each hinge consists of stationary hinge member 7, a hinge pin 8 and a movable hinge member 9.

The stationary hinge member 7 includes a U-shaped piece of sheet metal stamping 10 having hinge straps 11 and a plate 12 spot welded to the faces of the straps 11. Holes 13 are drilled through the plate and the straps for the reception of screws to fasten this hinge member to the body of the automobile.

The hinge pin 8 is mounted in the U-shaped piece 10 and secured to the sides thereof.

The hinge member 9 consists of two plates 14 spot welded together and each having one of its ends bent over to form an attaching plate 15 having screw openings 16 for the reception of screws securing said member to the door 5. The opposite ends of these plates are provided with alined openings through which the hinge pin 8 passes. A slot 17 in the plate 12 forms a guide for the hinge member 9 and prevents endwise movement of said member on the pin 8. If desired, short tubes 18 mounted on the pin 8 and abutting against the sides of the piece 10 and the apertured end of the hinge member 9 may be used to prevent endwise movement of said member on said pin.

A coiled spring 19 is mounted on the hinge pin 8 and has a centrally disposed U-shaped portion 20 which engages a shoulder 21 on the member 9 so as to exert pressure against said hinge to move the door 5 to closed position.

Full closing of the door is normally prevented by a stop shoulder 22 on the hinge member 9 coöperating with a yieldable stop 23. This stop 23 is slidably mounted in an opening 24 in the back of the piece 10 and is acted upon by a spring 25 mounted in a tubular housing 26 riveted to said back. The pressure of the spring 25 may be adjusted by set screw 27 mounted in the end of the housing 26 and engaging said spring. When the door is swung from full opening position, as shown in dotted lines in Fig. 1, by the spring 19 to its full line position, the stop 23 acting on the hinge member 9 prevents further closing of the door until the operator himself moves the door to closed position against the pressure of the spring 25 which on compression of the inward movement of the stop 23 into the housing exerts a pressure against said hinge member through the stop 23 and prevents the door from rattling when closed. If desired, the door may be maintained in its partially closed position for the purpose of ventilation.

What I claim as my invention is:

1. In a hinge, the combination of a fixed hinge member, a hinge pin carried by said member, a movable hinge member journaled on the hinge pin and having a stop shoulder, a movable stop mounted on the fixed hinge member and engageable with said stop shoulder, a spring engaging the movable hinge member to move it to closed position, and a spring acting against said stop to limit the closing movement of said movable hinge member by opposing the action of the first named spring.

2. In a hinge, the combination of a stationary hinge member having a U-shaped portion, a hinge pin mounted in the sides of said portion, a casing secured to the transverse part of said portion, a movable hinge member journaled on the hinge pin and having a stop shoulder, a slidable stop engageable with the stop shoulder, a spring on said hinge pin and engageable with said movable hinge member to move it to closed position, and a spring in said casing acting against said stop to limit the closing movement of said movable hinge.

3. In a hinge, the combination of a stationary hinge member comprising a U-shaped stamping having attaching hinge straps and a plate welded to said straps and provided with a guide slot, a hinge pin mounted in said stamping, a movable hinge member having a part guided in said slot and comprising a pair of stampings welded together and having laterally bent portions forming an attaching plate, and a coiled spring on said pin having a medial U-shaped portion engaging said movable hinge member to move it to closed position.

4. In a hinge, the combination of a stationary hinge member comprising a U-shaped stamping having attaching hinge straps, a hinge pin mounted in said stamping, a stop slidably mounted in the front end of said stamping, a spring housing secured to the front end of said stamping, a movable hinge member comprising a pair of stampings welded together and having laterally bent portions forming an attaching plate, a coiled spring on said pin having a medial U-shaped portion engaging said movable hinge member to move it to closed position, and a spring in said housing acting on said stop to move it against said movable hinge member to limit its closing movement.

In testimony whereof, I affix my signature, in presence of two witnesses.

SAMUEL NORTHCOTT.

Witnesses:
HOWARD MURPHY,
R. A. ROTT.